(12) United States Patent
Kim (10) Patent No.: US 6,547,610 B2
(45) Date of Patent: Apr. 15, 2003

(54) PARALLEL-OPERATED HYDRAULIC MOTOR TYPE STERN PROPULSION APPARATUS FOR BOATS AND HYDRAULIC SYSTEM FOR CONTROLLING THE SAME

(75) Inventor: Young Ju Kim, Taejon (KR)

(73) Assignee: Korea Institute of Machinery and Materials (KR)

( * ) Notice: Subject to any disclaimer, the term of this patent is extended or adjusted under 35 U.S.C. 154(b) by 0 days.

(21) Appl. No.: 09/818,642

(22) Filed: Mar. 28, 2001

(65) Prior Publication Data

US 2002/0034899 A1 Mar. 21, 2002

(30) Foreign Application Priority Data

Sep. 15, 2000 (KR) ........................................ 2000-54178

(51) Int. Cl.[7] ........................................... B63H 21/165
(52) U.S. Cl. ........................................... 440/5; 440/61
(58) Field of Search ................ 440/5, 49, 79, 440/61

(56) References Cited

U.S. PATENT DOCUMENTS

| | | | | |
|---|---|---|---|---|
| 2,936,730 A | * | 5/1960 | Patty, Jr. ..................... | 440/56 |
| 2,999,476 A | * | 9/1961 | Johnson ........................ | 440/61 |
| 4,871,332 A | * | 10/1989 | Rodriguez ...................... | 440/4 |
| 4,878,864 A | * | 11/1989 | Van Bentem ................... | 440/5 |
| 5,476,400 A | * | 12/1995 | Theophanides ................. | 440/5 |
| 5,653,107 A | | 8/1997 | Beck | |
| 6,099,367 A | | 8/2000 | White et al. | |

FOREIGN PATENT DOCUMENTS

EP          0 893 298 A1     1/1999

* cited by examiner

Primary Examiner—Sherman Basinger
(74) Attorney, Agent, or Firm—Burns Doane Swecker & Mathis, LLP (57) ABSTRACT

Disclosed herewith is a parallel-operated motor type stern propulsion apparatus for boats and hydraulic system. The stern propulsion apparatus includes a transom box disposed at the stern of a boat. A propulsion body situated in the transom body to be lifted and steered. The propulsion body includes an upper body supported by a lifting shaft transversely fitted into the transom box, a yoke connected to the lower body, and two lower bodies each attached to each of the lower ends of the yoke. Two hydraulic motors are each positioned in a lower body and each connected to a propeller. Lifting cylinders are attached to the transom box for lifting the propulsion body around the lifting shaft. A steering cylinder is attached to the transom box for steering the propulsion body around a steering pin attached to the lifting shaft to the right and left.

11 Claims, 7 Drawing Sheets

PARALLEL-OPERATED HYDRAULIC MOTOR TYPE STERN PROPULSION APPARATUS FOR BOATS AND HYDRAULIC SYSTEM FOR CONTROLLING THE SAME

This application claims priority under 35 U.S.C. §§119 and/or 365 to 2000-5478 filed in Republic of Korea on Sep. 15, 2000; the entire content of which is hereby incorporated by reference.

BACKGROUND OF THE INVENTION

1. Field of the Invention

The present invention relates generally to a parallel-operated hydraulic motor type stern propulsion apparatus for boats and a hydraulic system for controlling the same, in which propellers are driven by two parallel-operated hydraulic motors, and the sailing speed of a boat and the forward and rearward drives and steering and lifting angles of the stern propulsion apparatus are remotely controlled.

In particular, the present invention relates to a parallel-operated hydraulic motor type stern propulsion apparatus for boats and hydraulic system for controlling the same, in which the control of steering and lifting angles can be performed by a hydraulic system for the stern propulsion apparatus, the mounting position of a main engine can be freely selected to allow the cabin of the boat to be conveniently designed. This apparatus comprises hydraulic power system and control system, one transom box, one upper body, one yoke and two lower bodies. Furthermore, this apparatus can improve its durability by the parallel-operation of propellers with an hydraulic system for the controlling of reversing, the starting and stopping of the main-engine, for the manueuvering of sailing speed, the reversing operation of the boat and steering and lifting angles of the stern propulsion apparatus hydraulically.

2. Description of the Prior Art

In a conventional stern propulsion apparatus for boats and hydraulic system for controlling the same, a main engine operates a propeller via a reduction gear, a clutch, a reverse gear and a propeller shaft. Accordingly, when the propeller is brought into a submerged projection or floating matters, or seaweed is wound around the propeller, its power train and its main engine are damaged, thereby causing a boat to run into serious danger. Additionally, a steering device for steering the boat to the right and left and a lifting device for adjusting the stern propulsion apparatus to a proper height depending variations in the depth of the sea are controlled by an independent hydraulic system, so the cost of the stern propulsion apparatus and hydraulic system are increased. Furthermore, when the conventional stern propulsion apparatus for a boat sized 6 tons or less is designed to generate 300 horsepower so as to meet the recent demand for high speed boat, the output of its hydraulic motor is enlarged, thereby increasing the hydrodynamic resistance of the stern propulsion apparatus.

Furthermore, in the conventional stern propulsion apparatus driven directly by a main engine, a lifting angle is restricted to 60° or less and breakdown easily occurs owing to the necessity for additional reduction gear and reverse gear additionally.

SUMMARY OF THE INVENTION

The main object of the present invention is to provide a parallel-operated hydraulic motor type stern propulsion apparatus and hydraulic system (main pump 1 set, motor 2 sets) for controlling the same, which is capable of reducing the hydrodynamic resistance of the apparatus that causes 80% of the required power, by employing two hydraulic motors each having parallel-operated propellers.

Another object of the present invention is to provide a parallel-operated hydraulic motor type stern propulsion apparatus and hydraulic system for controlling the same, which is capable of reducing the mounting area, installation costs and weight of the stern propulsion apparatus, utilization of propulsion energy effectively and simplifying the hydraulic system, by supply working fluid from the same hydraulic system for driving propeller to steering and lifting devices.

In order to accomplish the above object, the present invention provides a parallel-operated motor type stern propulsion apparatus for boats, comprising: a transom box disposed at the stern wall of a boat; a propulsion body situated in the transom body to be lifted and steered, the propulsion body including, an upper body supported by a lifting shaft transversely fitted into the transom box, a yoke connected to the upper body, and two lower bodies attached apart to the both (port and starboard) lower ends of the yoke: two hydraulic motors each positioned in each of the lower bodies (port and starboard) and each connected to a propeller via each propeller shaft; lifting cylinders attached to the transom box for lifting the propulsion body around the lifting shaft; and a steering cylinder attached to the transom box for steering the propulsion body around a steering pin attached to the lifting shaft toward the starboard and port side.

BRIEF DESCRIPTION OF THE DRAWINGS

The above and other objects, features and other advantages of the present invention will be, more clearly understood from the following detailed description taken in conjunction with the accompanying drawings, in which.

DESCRIPTION OF THE PREFERRED EMBODIMENTS

Reference now should be made to the drawings, in which the same reference numerals are used throughout the different drawings to designate the same or similar components.

A parallel-operated hydraulic motor type stern propulsion apparatus for boats and hydraulic system for controlling the same is constructed as illustrated in FIGS. 1 to 7. In these drawings, reference numeral 1 designates a main engine.

Figure 1:
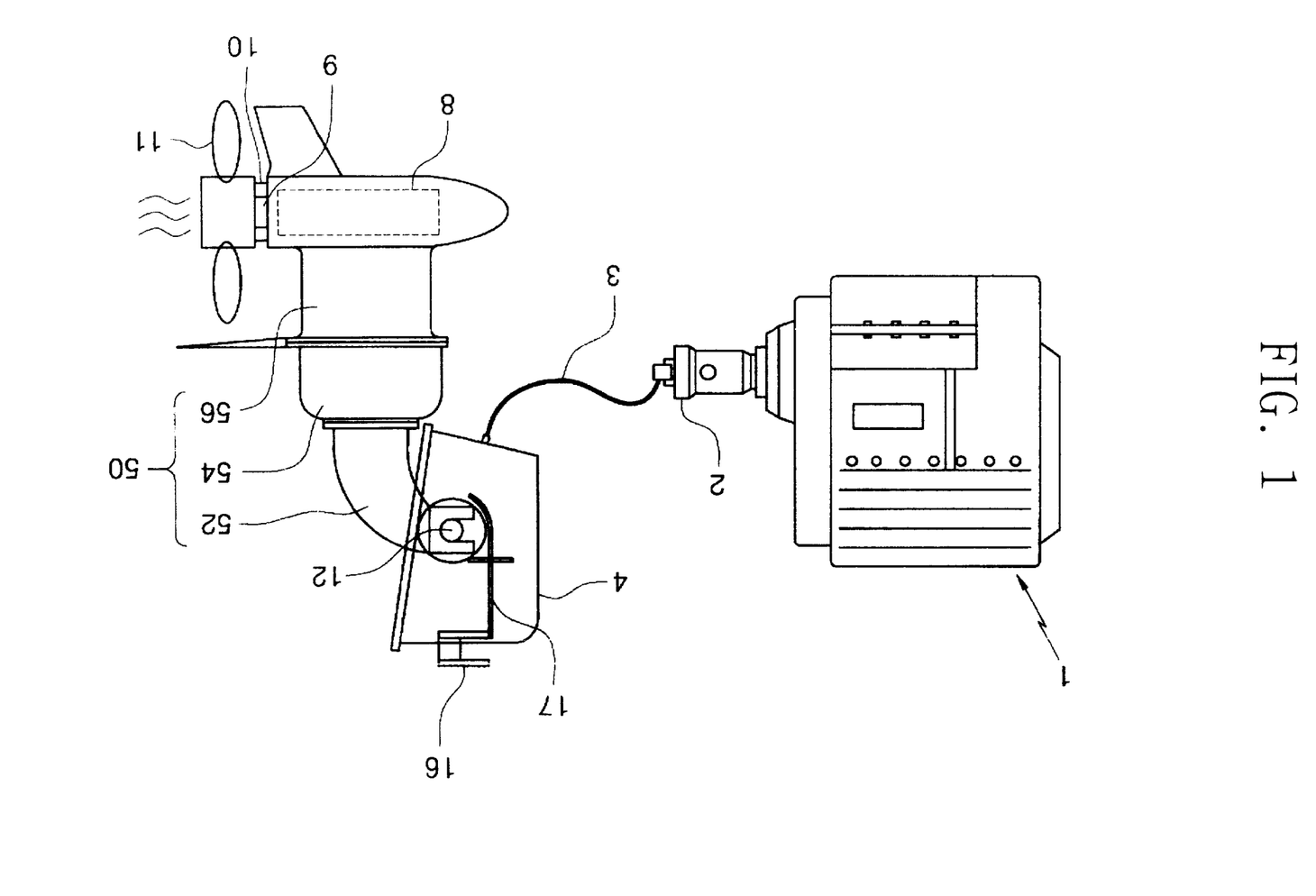
FIG. 1 is a view showing the construction of the parallel-operated hydraulic motor type stern propulsion apparatus in accordance with an embodiment of the present invention.

FIG. 1 is a view showing the construction of the parallel-operated hydraulic motor type stern propulsion apparatus.

In the parallel-operated hydraulic motor type stern propulsion apparatus, a is working fluid is supplied through a hydraulic hose (not shown) from a hydraulic pump 2 situated beside the main engine 1 to the stern propulsion apparatus, each of its propeller shafts 9 is separated from each hydraulic motor shaft 40 so as to allow two propellers 11 and connection manner to be changed without changing the hydraulic motor shaft 40, the propellers 11 are each provided at the end of the propeller shaft 9, a lifting shaft 12 is mounted to be inserted into the sidewalls of a transom box 4, and an upper body 52 and a steering pin 15 are provided at the center of the lifting shaft 12, thereby allowing the steering and lifting angles of the stern propulsion apparatus to be controlled.

Main hydraulic pump 2 and circulation pump 20 are connected in series to the main engine 1 situated in a sealed engine room. Two hydraulic motors 8 are each connected, to hydraulic pump 2 so that a working fluid discharged from the hydraulic pump 2 is supplied to the hydraulic motors 8 through the upper body 52, yoke 54 and lower body 56 of the stern propulsion apparatus. As may be seen with reference to FIG. 3, the yoke 54 of the propulsion body 50 includes two lower bodies 56 attached to lower ends of the yoke 54. The two lower bodies 56 each include one of the two hydraulic motors 8 in parallel with each other.

Figure 3:
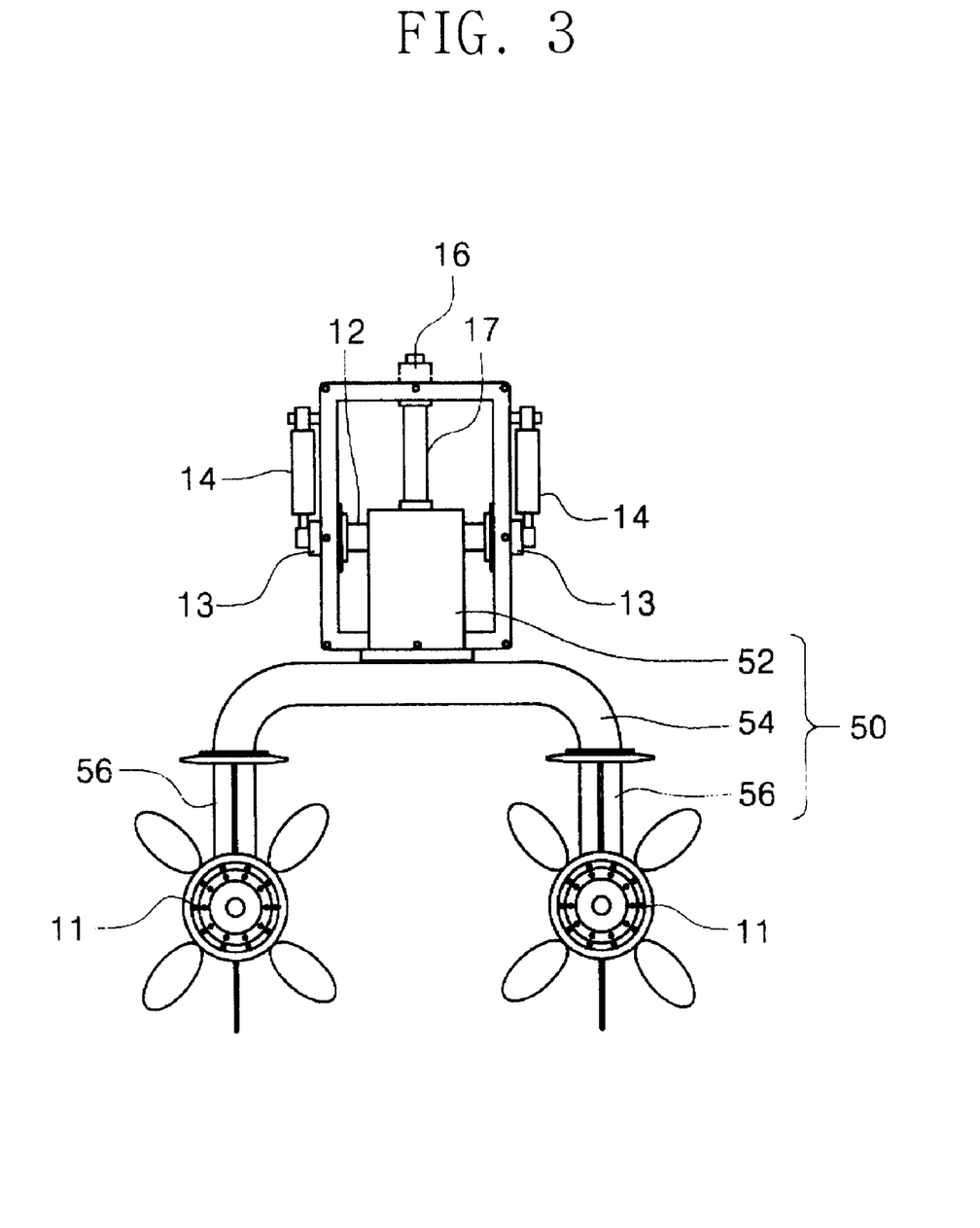
FIG. 3 is a side view showing the stern propulsion apparatus in accordance with an embodiment of the present invention.

Two lifting cylinders 14 and a steering cylinder 18, situated on the sidewalls and top of the transom box 4 are each connected to the hydraulic pumps 20 so that a working fluid discharged from the hydraulic pump 20 is supplied to the lifting cylinders 14 and the steering cylinder 18 through a hydraulic hose (not shown). The propulsion body 50 is situated in the interior of the transom box 4 attached to the stern wall opening of a boat through a lifting shaft 12 and a steering pin 15.

Figure 5A:
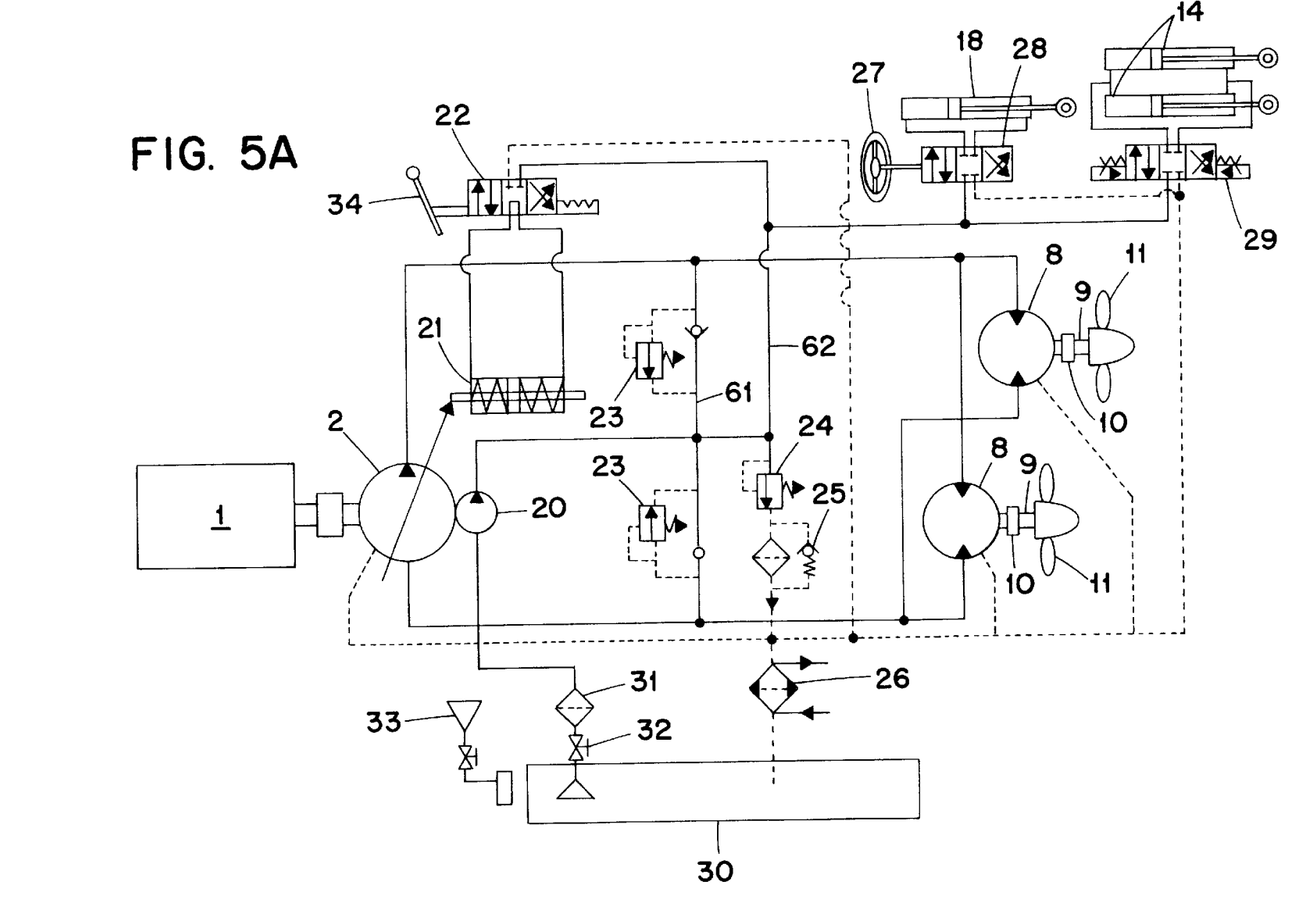
FIG. 5A is a hydraulic circuit diagram showing a hydraulic system used to control the forward and rearward operation, sailing speed and lifting angle of the stern propulsion apparatus in accordance with an embodiment of the present invention.
Figure 5B:
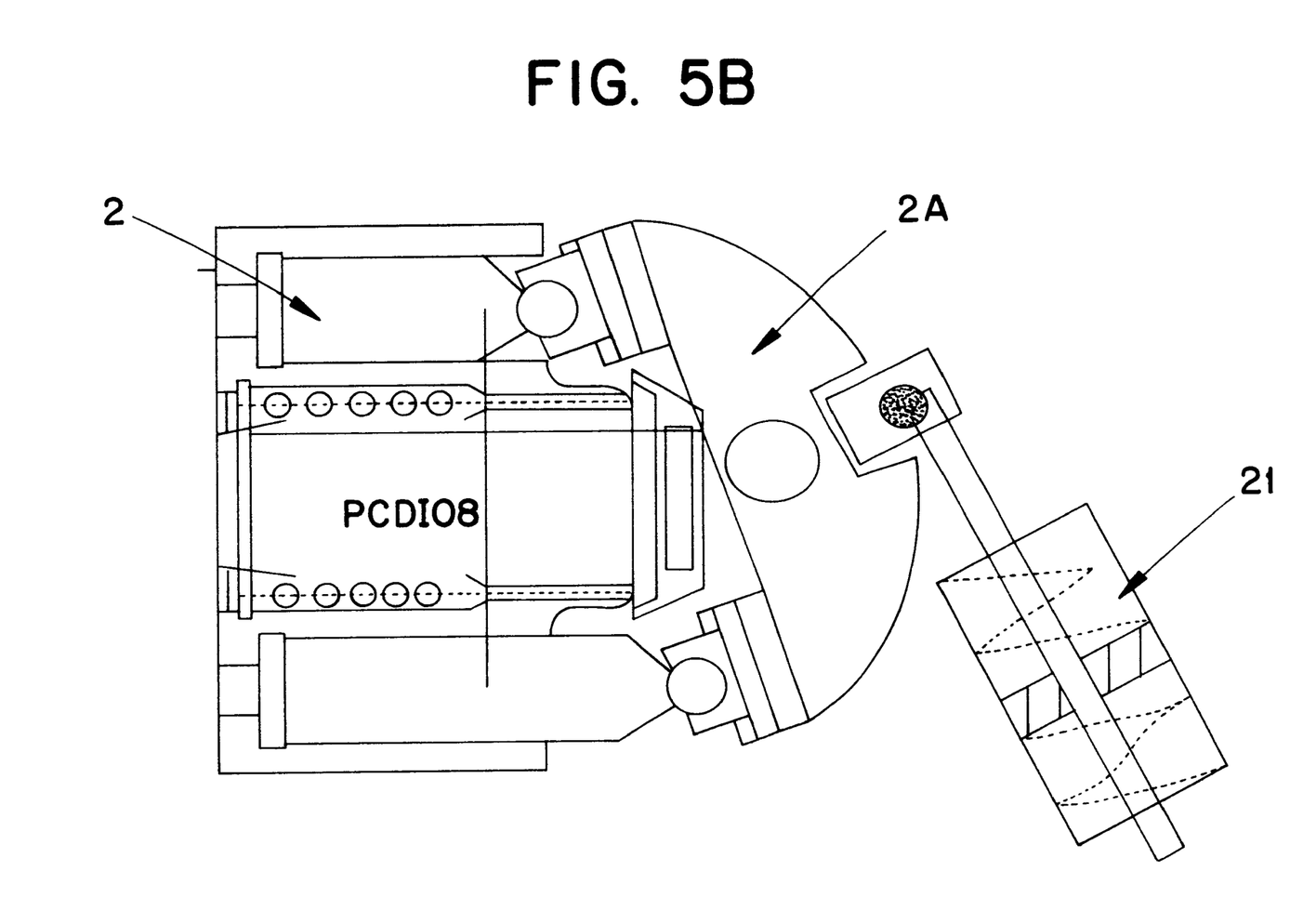
FIG. 5B is an embodiment of the present invention illustrating a wobble plate of a hydraulic cylinder of the hydraulic circuit diagram of FIG. 5A, in accordance with an embodiment of the present invention.
Figure 6:
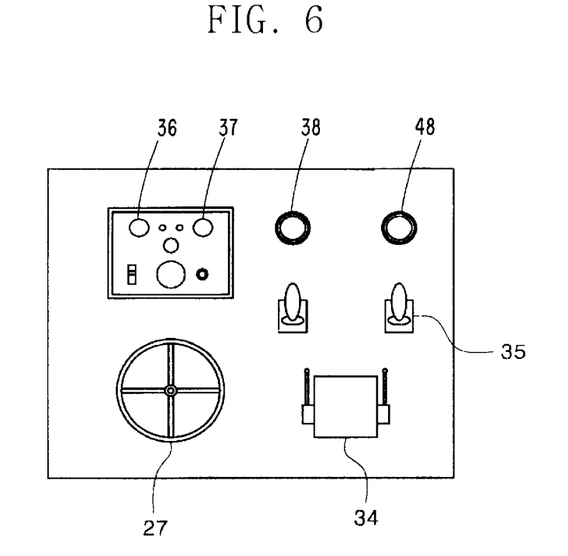
FIG. 6 is a view showing the construction of the control panel used to remotely control the stern propulsion apparatus in accordance with an embodiment of the present invention.

Any maneuvering activity, i.e. sailing speed, reversing operation, lifting and steering of the stern propulsion apparatus can be accomplished through a hydraulic system shown in FIGS. 5A and 5B by the manipulation of a control panel shown in FIG. 6.

Figure 4:
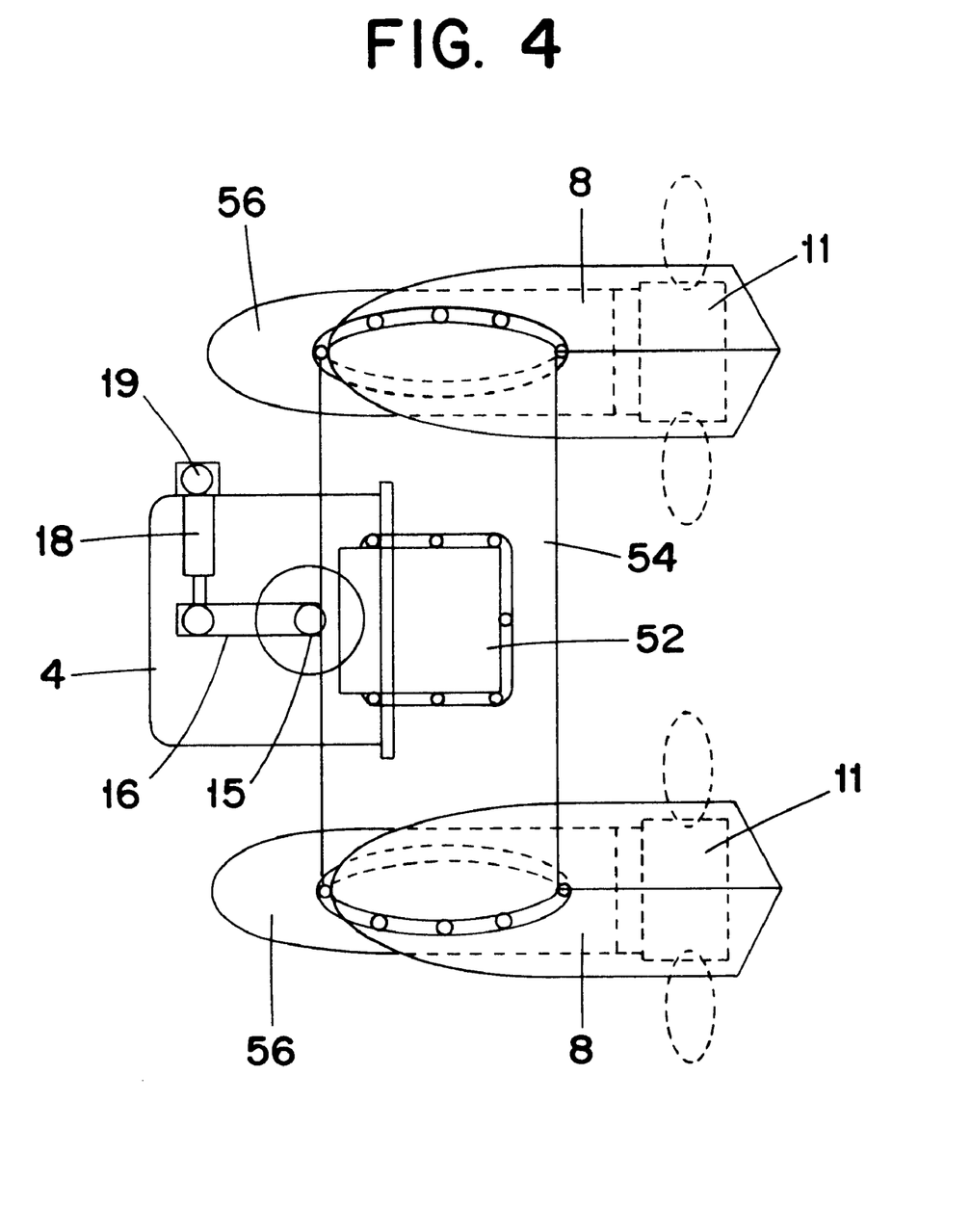
FIG. 4 is a plan view showing the stern propulsion apparatus in accordance with an embodiment of the present invention.

The steering angle can be controlled within a range of ±30° through a steering lever 16 shown in FIG. 4 and connected to the steering cylinder 18 and a steering link 17 shown in FIG. 1, utilizing a working fluid, which is supplied from the hydraulic system as a steering wheel 27 is turned clockwise and counterclockwise. The lifting angle can be controlled within a range of ±90° through a lifting lever 13 connected to two lifting cylinders 14 (shown with respect to FIG. 3) and a lifting shaft 12 to which the lift lever 13 is attached, utilizing a working fluid, which is supplied from the hydraulic system as a speed-change and reverse lever 34 is turned forward (push) or rearward (pull).

Figure 2:
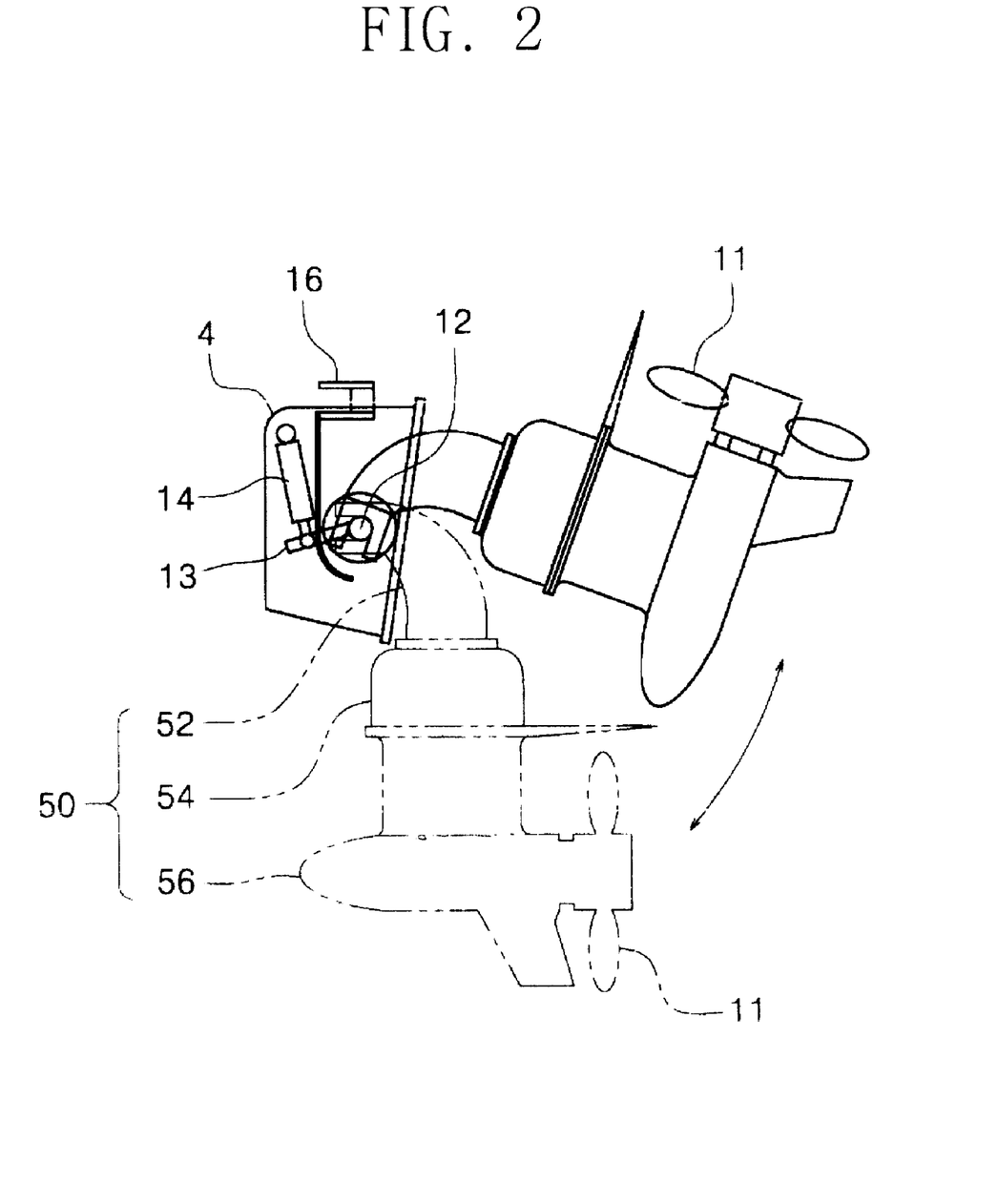
FIG. 2 is a side view showing the stern propulsion apparatus in a state in which a propulsion body is lifted at a certain angle while being attached to the transom box in accordance with an embodiment of the present invention.

FIG. 2 is a side view showing the stern, propulsion apparatus in a state in which the propulsion body 50 is lifted at a certain angle while being attached to the transom box 4.

The lifting shaft 12 supported by two bearings positioned in holes (not shown) formed in the transom box 4 is connected to the lifting cylinders 14 through the lifting levers 13 each being positioned on the side of the transom box 4.

The lifting levers 13 are each fixedly attached to the lifting shaft 12, and the lifting shaft 12 is fixedly connected to the upper body 52, thereby allowing the upper body 52 together with yoke 54, lower bodies 56 and propellers 11 to be lifted and lowered.

Figure 7:
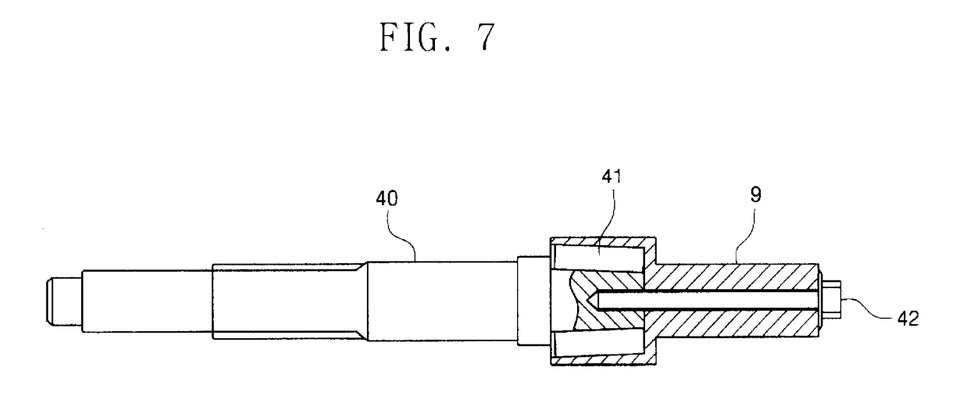
FIG. 7 is a partial cross-section showing a propeller shaft disposed between each hydraulic motor and each propeller in accordance with an embodiment of the present invention.

The hydraulic motors 8 are each situated in each of the lower bodies 56 of the propulsion body 50. Two propellers 11 are connected to each hydraulic motor 8 via each propeller shaft 9 individually in detail, the propeller shaft 9 is connected to the hydraulic motor shaft 40, as shown in FIG. 7, utilizing two keys 41 and one tension bolt 42.

In order to reduce the weight of the stern propulsion apparatus, the transom box 4, the upper body 52, the yoke 54 and the lower bodies 56 are preferably made of aluminum alloy except for the hydraulic system with which a high-pressure working fluid is brought into contact. The hydraulic motors 8 and the propeller shafts 9 are preferably made of high tensile steel in consideration of the high-pressure working fluid, and rotational torque and seawater corrosion.

As shown in FIGS. 2 and 5A, the working fluid reduced in pressure to 30 atmospheric pressure through the pressure reduction valve 24 and the solenoid valve 29 of the hydraulic system is supplied to the two lifting cylinders 14 secured to the sidewalls of the transom boxes 4, the lifting cylinders 14 are connected to the two lifting levers 13, the lifting levers 13 are remotely controlled upward and downward by the solenoid valve 29 operated by manipulation of the lifting switch 35 on the control panel, as shown in FIG. 6, and the propulsion body 50 attached to the lifting shaft 12 in the transom box 4 is lifted and lowered within 90 degrees depending upon the rotation of the lifting shaft, thereby adjusting the position of the propulsion body 11 properly.

As illustrated in FIGS. 3 and 4, the transom box 4 and the upper body 52 are assembled together through the lifting shaft 12, the upper body 52 and the lower bodies 56 are connected by the inverse U-shaped yoke 54 so as to space the propellers 11 apart therefrom, the steering lever 16 and the steering cylinder 18 connected to the steering link 17 are provided on the upper surface of the transom box 4, and the lifting levers 13 and the lifting cylinders 14 connected to the lifting shaft 12 are provided on the sides of the transom box 4, thereby allowing the propulsion body 50 to be steered to the starboard and port side and to be lifted and lowered.

FIG. 5A is a hydraulic circuit diagram showing the hydraulic system used to control the rotating direction and revolution speed of propellers in clockwise or counter-clockwise and lifting angle of the stern propulsion apparatus.

The hydraulic pump 2 and the circulation pump 20 operated by the main engine 1 are mounted in the same casing. That is, the gear type circulation pump 20 is disposed beside the hydraulic pump 2 to be operated at the same number of rotations as that of the hydraulic pump 2. The circulation pump 20 supplies a working fluid, which is reduced in pressure to 30 atmospheric pressure by the pressure reduction valve 24, to a pilot valve 22 (operated by the speed-change and reverse lever 34), a servo cylinder 21, a steering valve 28 and a solenoid valve 29 being connected to the steering cylinder 18 and two lifting cylinders 14 respectively through a second fluid supply passage. A working fluid supplied to the two hydraulic motors 8 for operating the propellers 11 is adjusted to 350 atmospheric pressures through relief valves 23 situated in reverse directions on a first fluid passage 61. While the stern propulsion apparatus is operated continuously, the increase in temperature and reduction in viscosity of the working fluid is prevented by cooling the working fluid discharged from the relief valves 23 and the pressure reduction valve 24 to a fluid cooler 26. Impurities contained in working fluids sucked from an oil tank 30 to the pumps 2 and 20 and returned to the oil tank 30 are removed in a suction filter 31 and a return filter 25. When a working fluid stored in the oil tank 30 leaks, the hydraulic system is replenished with a working fluid 15 through a replenishment inlet 33.

In order to maneuver a boat forward or rearward by changing the rotating directions of the propellers 11 directly connected to the hydraulic motors 8, the operation of the pilot valve 22 and the servo valve 21 should be controlled by manipulation of the speed-change and reverse lever 34 situated on the control panel. In accordance with an embodiment of the present invention, the servo cylinder 21 controls a flow direction of a working fluid in the hydraulic pump 2. The servo cylinder 21 controls the flow direction of the working fluid by changing an incline angle of a wobble plate 2A of the hydraulic pump 2, as shown with reference to FIG. 5B. The moving speed of the boat can be controlled by the operational speed of the main engine 1.

FIG. 6 is a view showing the construction of the control panel used to remotely control the stern propulsion apparatus.

The control panel includes pressure gauges 36 and 37 for indicating the pressures of the working fluid and cooled seawater, an indicator for indicating the temperatures of the working fluid and the cooled seawater and the rotational speed of the main engine and monitoring the charging voltage of a storage battery for starting the main engine 1, and a starting and stopping switch for the main engine 1. The starting and stopping of a bilge pump for discharging bilge, the speed control of the main engine 1, the rotating direction of propellers and lifting and steering angles of the stern propulsion apparatus should be controlled from the control panel.

The speed-change and reverse lever 34 is used to remotely control the moving speed of the boat at the direction of the forward or rearward drives, a bilge pump switch 38 for switching the power source of a storage battery is used to start and stop a bilge pump situated in the engine room, and a lifting switch 48 for switching the power source of the solenoid valve 29 is used to lift the stern propulsion apparatus.

FIG. 7 is a partial cross-section showing the propeller shaft disposed between each hydraulic motor and each propeller. Two keys 41 each having a rectangular cross-section are disposed on the tapered portions of each hydraulic motor shaft 40, the propeller shaft 9 is fitted over the keys 41 disposed on the tapered portion of the hydraulic motor shaft 40, and a bolt 42 is secured to the hydraulic motor shaft 40 after passing through the propeller shaft 9 All of these elements should be made of stainless steel so as to prevent corrosion due to contact with seawater.

In the parallel-operated motor type stern propulsion apparatus of the present invention, control of rotational direction of propellers, lifting angle and steering angle of the stern propulsion apparatus can be remotely controlled by controlling a flow direction, pressure, quantity of working fluid, which is supplied by the hydraulic pump 2 directly operated by the main engine in the engine room, through the remote control of the speed-change and reverse lever 34, the steering handle 27 and the lifting switch 35, which is connected to the solenoid valve 29.

When the stern propulsion apparatus is mounted to the stern wall of the boat and the steering and lifting angles of the stern propulsion apparatus are remotely controlled, the steering lever 16 mounted on the top of the transom box 4 is operated by the single steering cylinder 18 and the lifting levers 13 attached to the right and left ends of the lifting shaft 12 are operated by the two (port and starboard) lifting levers 14. Accordingly, the steering pin 15 is perpendicularly assembled with the lifting shaft through a hinge situated on the top of the upper body 5 and the stern propulsion apparatus should be freely operated while being lifted.

In order to the change the speed and proceeding direction of a boat, the number of rotations and rotational direction of each propeller can be changed. These can be performed by adjusting the amount of fuel injection of the main engine with the speed-change and reverse lever 34 which is connected remotely to the pilot valve 22.

In brief, two hydraulic motors 8 coupled to propellers 11 are each mounted in each lower body 56. In order to reduce the area for mounting the apparatus and the weight of the apparatus, the lower bodies 56 are utilized as hydraulic motor casings. Each hydraulic motor 8 is comprised of a cylinder, a piston, a drive shaft, a wobble plate support, a bearing housing and a fluid supply conduit. Since each hydraulic motor shaft 40 and a propeller 11 is connected through a single propeller shaft 9 and a bolt 42, the sealing room 10 is provided so as to prevent seawater from entering the interior of the stern propulsion apparatus. If in a large-scale hydraulic system discharging a working fluid, of about, in a certain direction, the rotational direction of the hydraulic motor is changed directly by the pilot valve 22, thus causing unstable operation and noise. Accordingly, in order to desirably control the working fluid depending on load conditions, relief valves 23 should be added. When a propeller having a proper diameter and pitch is selected according to the result of site test and, thereafter, the proper propeller is changed with an original one, the hydraulic motor shaft 40 and the propeller shaft 9 should be manufactured separately so as to prevent the entire hydraulic motor from being changed. Each hydraulic motor shaft 40 is connected to the propeller shaft 9 through the keys 41 disposed on one end of the hydraulic motor shaft 40 and the propeller shaft 9 is secured to the hydraulic motor shaft 40 by means of the lengthy bolt 42.

The working fluid of 300 atmospheric pressures used to operate the hydraulic motors 8 for operating the propellers 11 is supplied by the hydraulic pump 2 directly operated by the main engine situated at a certain position in the engine room. The adjustment in the amount of the working fluid and the change of the rotational direction are performed by the servo cylinder 21 operated by the manipulation of the speed-change and reverse lever 34 on the control panel.

When there is a concern that the stern propulsion apparatus may be damaged by submerged projections or the stern propulsion apparatus is repaired or changed, the stern propulsion apparatus can be lifted at 90°. When the stern propulsion apparatus is lifted, the working fluid is reduced in pressure to 30 atmospheric pressures by the pressure reduction valve 24, the working fluid is supplied to the two lifting cylinders 14 by operation of the solenoid valve 29 by means the lifting switch 35. In this case, when the steering handle 27 is turned clockwise or counterclockwise the steering valve 28 under the control panel is directly operated and the working fluid reduced in pressure is supplied to the single steering cylinder 18, thereby steering the stern propulsion apparatus to the port or starboard side.

In accordance with the present invention, the following advantages can be accomplished.

Since a speed reduction gear, a clutch, a reversing gear and a drive shaft are eliminated and only hydraulic pumps are included in the stern propulsion apparatus, the placement of an engine room is easily performed. When the output of the stern propulsion apparatus is increased over 300 horsepower, the hydrodynamic resistance of a lower body in which each hydraulic motor is mounted is reduced. Since a set of transom boxes, upper bodies and lifting and steering devices can be eliminated rather than two independent propulsion apparatuses each having half the required capacity, the weight of the stern propulsion apparatus, the area for mounting the stern propulsion apparatus and the manufacturing cost of the stern propulsion apparatus are reduced. Since a hydraulic motor shaft can be firmly connected to a propeller shaft in comparison with a conventional spline fashion, the stern propulsion apparatus does not vibrate owing to its imbalance and the stern propulsion apparatus and the propeller shaft are not loosed from the hydraulic motor shaft owing to the thrust and the variation in torque, thereby improving the durability of a shaft system. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A parallel-operated motor type stern propulsion apparatus for boats, comprising:
    a transom box disposed at a stern wall of a boat;
    a propulsion body situated in said transom box to be tilted and steered, said propulsion body including:
        an upper body supported by a tilting shaft transversely fitted into said transom box,
        a yoke connected to said upper body, and
        two lower bodies each attached to lower ends of said yoke; and
        a hydraulic motor positioned in each of said lower bodies and each connected to a propeller;
    tilting cylinders attached to said transom box for tilting said propulsion body around said tilting shaft; and
    a steering cylinder attached to said transom box for steering said propulsion body right and left with respect to a steering pin attached to said tilting shaft.

2. The stern propulsion apparatus according to claim 1, wherein an output shaft of each of said hydraulic motors is connected to a propeller shaft in a taper manner utilizing keys and a tension bolt thereby facilitating a change of propellers together with said propeller shafts.

3. The stern propulsion apparatus according to claim 1, wherein each of said hydraulic motors has a capacity that is one half or less that of a single hydraulic motor used in a propulsive system with an equal driving engine.

4. A hydraulic system for controlling a stern propulsion apparatus, comprising:
    a hydraulic pump and a circulation pump connected to an output end of a main engine in a boat;
    a first fluid supply passage for connecting said hydraulic pump to hydraulic motors in parallel;
    a servo cylinder for controlling flow direction of working fluid in said hydraulic pump by changing an inclined angle of a wobble plate of said hydraulic pump;
    a pilot valve situated on a second fluid supply passage for controlling a working fluid flow of said servo cylinder;
    a steering valve situated on said second fluid supply passage for controlling a steering cylinder; and
    a tilting valve situated on said second fluid supply passage for controlling two tilting cylinders.

5. The stern propulsion apparatus according to claim 4, further comprising two relief valves, which are situated in opposite directions so as to restrict a maximum hydraulic force exerted on said hydraulic motors.

6. The stern propulsion apparatus according to claim 4, further comprising a pressure reduction valve for reducing the pressure of said working fluid to a set pressure, said pressure reduction valve being situated on said second fluid supply passage from said pilot valve.

7. The stern propulsion apparatus according to claim 1, further comprising a main engine for generating a dynamic force.

8. The stern propulsion apparatus according to claim 7, further comprising a hydraulic system for controlling flows of working fluid in the stern propulsion apparatus.

9. The stern propulsion apparatus according to claim 8, wherein said hydraulic system further comprises:
    a hydraulic pump and a circulation pump connected to an output end of said main engine;
    a first fluid supply passage for connecting said hydraulic pump to hydraulic motors in parallel;
    a servo cylinder for controlling flow direction of working fluid in said hydraulic pump by changing an inclined angle of a wobble plate of said hydraulic pump;
    a pilot valve situated on a second fluid supply passage for controlling moving strokes of said servo cylinder;
    a steering valve situated on said second fluid supply passage for controlling a steering cylinder; and
    a tilting valve situated on said second fluid supply passage for controlling two tilting cylinders.

10. The stern propulsion apparatus according to claim 1, further comprising a hydraulic system for controlling flows of working fluid in the stern propulsion apparatus.

11. The stern propulsion apparatus according to claim 10, wherein said hydraulic system comprising:
    a hydraulic pump and a circulation pump connected to an output end of a main engine in a boat;
    a first fluid supply passage for connecting said hydraulic pump to hydraulic motors in parallel;
    a servo cylinder for controlling flow direction of working fluid in said hydraulic pump by changing an inclined angle of a wobble plate of said hydraulic pump;
    a pilot valve situated on a second fluid supply passage for controlling moving strokes of said servo cylinder;
    a steering valve situated on said second fluid supply passage for controlling a steering cylinder; and
    a tilting valve situated on said second fluid supply passage for controlling two tilting cylinders.

* * * * *